Oct. 20, 1931.    W. G. KIRCHHOFF    1,828,049
ADJUSTABLE GUIDE FOR DOUGH MOLDERS
Filed May 9, 1928    3 Sheets-Sheet 1
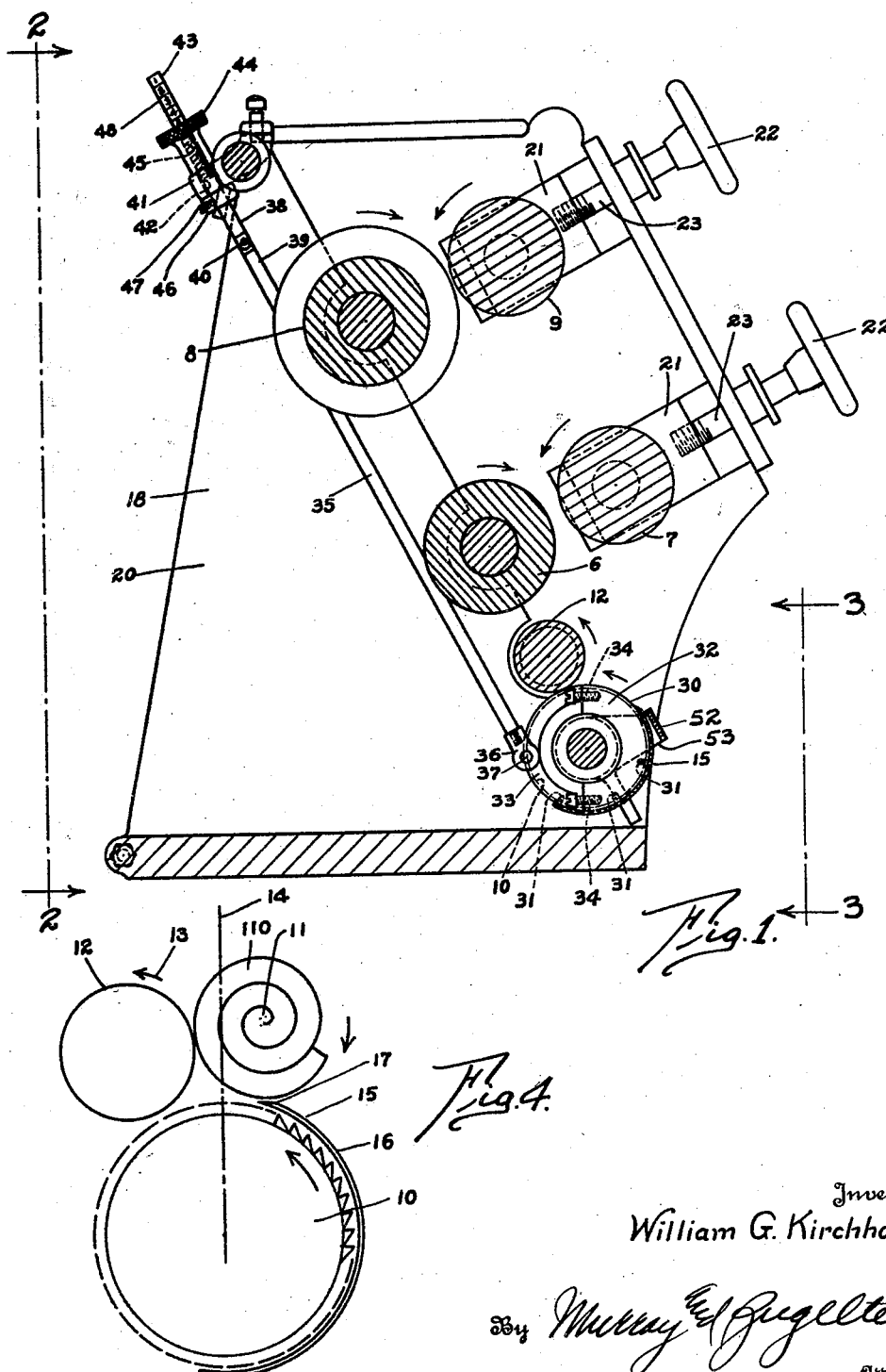
Inventor
William G. Kirchhoff

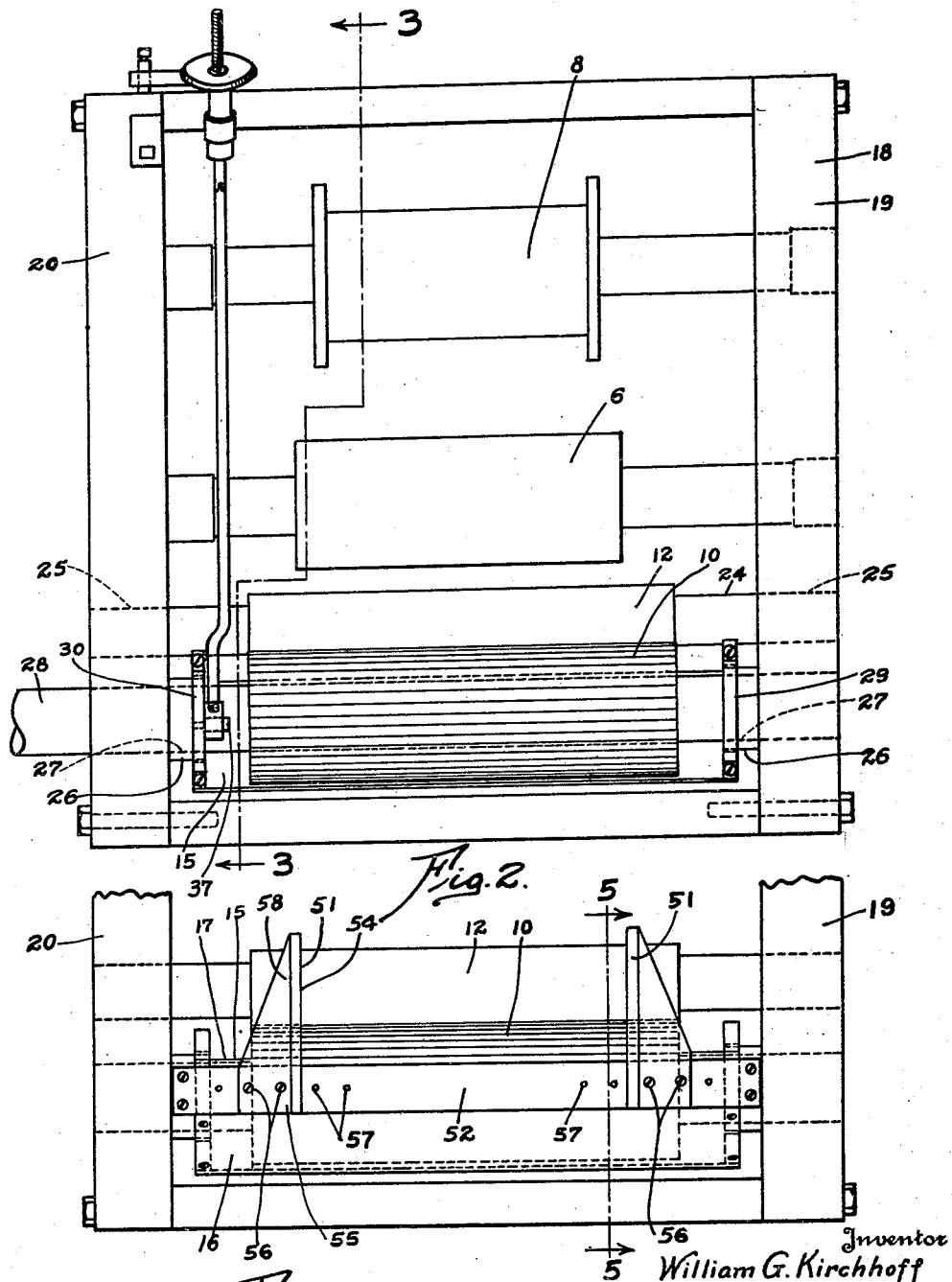

Patented Oct. 20, 1931

1,828,049

UNITED STATES PATENT OFFICE

WILLIAM G. KIRCHHOFF, OF CINCINNATI, OHIO, ASSIGNOR, BY DIRECT AND MESNE ASSIGNMENTS, OF ONE-HALF TO THE J. H. DAY COMPANY, OF CINCINNATI, OHIO, A CORPORATION OF OHIO, AND ONE-HALF TO THOMSON MACHINE COMPANY, OF BELLEVILLE, NEW JERSEY, A CORPORATION OF NEW JERSEY

ADJUSTABLE GUIDE FOR DOUGH MOLDERS

Application filed May 9, 1928. Serial No. 276,305.

This invention relates to an improvement in dough molders of the type wherein a curling roller is utilized for fabricating cylindrical rolls or loaves, from dough in the form of sheets.

An object of the invention is to provide adjustable curling or rolling means which will operate effectively on sheets of dough of various weights and sizes.

Another object is to provide, in conjunction with the curling or rolling means, an indicator for insuring accurate adjustment of the device when it is desired to alter the weight or size of the fabricated loaf.

Another object is to provide a device for the purposes stated, which is simple of construction and operation.

These and other objects are attained by the means described herein and disclosed in the accompanying drawings, in which:

Fig. 1 is a cross-sectional view of a portion of a dough molding device embodying the device of invention.

Fig. 2 is an elevational view taken on line 2—2 of Fig. 1.

Fig. 3 is an elevational view taken on line 3—3 of Fig. 1.

Fig. 4 is a diagrammatical view showing the principle of operation of the device.

Figure 5:
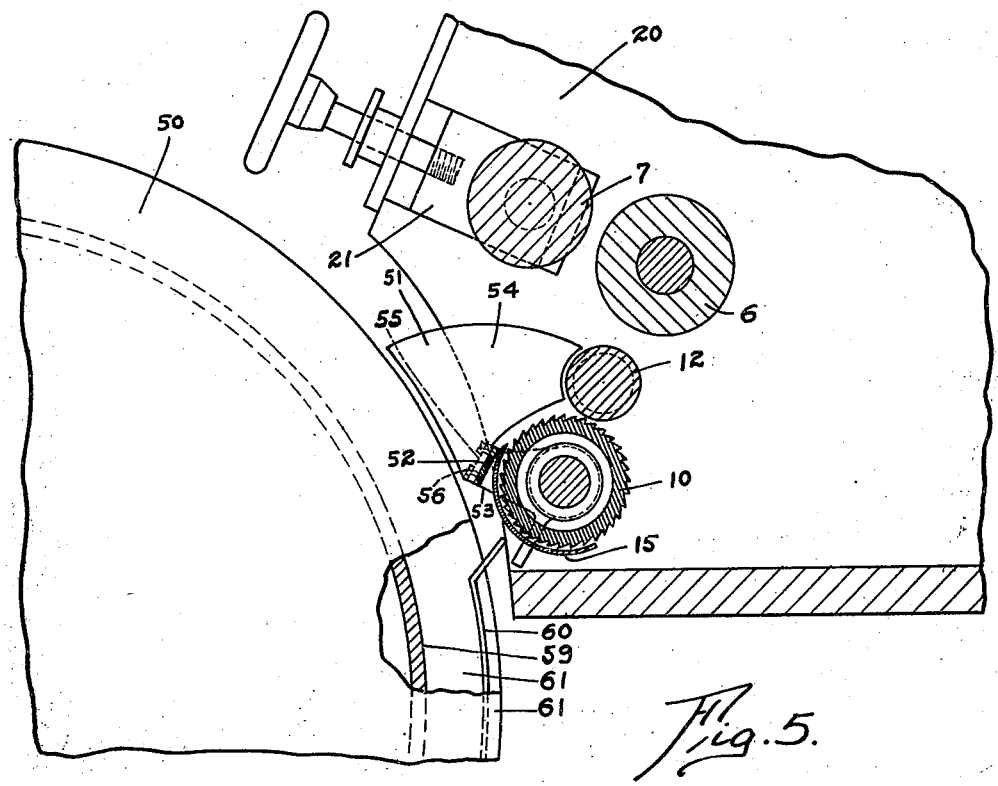
Fig. 5 is a cross-sectional view taken on line 5—5 of Fig. 3.

The device of this invention is adapted for use on any dough molder employing a curling roller, or other roller performing the function of a curling roller. Reference is made to the co-pending application of William G. Kirchhoff, Serial Number 11,086, wherein is disclosed one type of dough molder to which the device of the present invention may be conveniently attached.

In the drawings, the pairs of cooperating driven rollers 6 and 7, and 8 and 9 correspond to pairs of driven rollers 62 and 63, and 64 and 65, respectively, of the referred to application. Measured lumps of dough are successively inserted between the pair of rolls 8 and 9 where they are flattened and worked into sheet form. The dough in this form passes between the second pair of rollers 6 and 7 wherein the flattening operation is completed.

The sheet of dough thus formed is projected downwardly until its free end 11 strikes the serrated curling roller 10, which is driven in counter-clockwise direction as indicated by the arrows in Figs. 2 and 4. The rotating curling roller thereupon carries the end 11 toward a pilot roller 12, driven in a counter-clockwise direction as indicated by the arrow 13. The pilot roller thereupon contacts the end 11 and turns said end upon itself. Continued rotation of the curling and pilot rollers results in a spiral winding of the sheet about a central longitudinal axis of rotation. The roll or loaf thus formed is indicated by 110 in Fig. 4.

Attention is now called to the fact, that, although the center of gravity of the cylindrical loaf 110 may be disposed considerably to the right of a vertical line 14 passing through the central axis of curling roller 10, the counter-clockwise rotation of the curling roller will serve to preclude gravitation of the loaf down the face of the curling roller. However, when a guide 15 (Fig. 4) is interposed between loaf 110 and curling roller 10, as shown, the lifting action of the curling roller is immediately overcome whereupon loaf 110 will roll down the outer face 16 of guide 15 under the influence of gravity. It should be noted that the size and weight of any loaf will bear a direct relationship to the distance of end 17 of the guide from imaginary line 14. For example, if, in operation, the guide 15 (Fig. 4) were moved in a clockwise direction so as to increase the distance from line 14 to end 17, the lifting force of curling roller 10 on the loaf may exceed the downward force of gravity, whereupon the loaf would be rotated indefinitely on top of the curling roller. If, however, the guide 15 be moved in the opposite direction, toward line 14, the lifting force of the curling roller is overcome, whereupon the force of gravity, aided by rotating pilot roller 12, causes displacement of the loaf.

The means for accomplishing the above is as follows: The dough molder frame 18 comprises a pair of upright sides 19 and 20 provided with suitable bearings for rotatably supporting the rollers 6, 7, 8 and 9. A shown in Fig. 2, slidable bearings 21, actuable by handwheels 22 and screws 23, may be employed for adjusting the distance of roller 7 from roller 6, and roller 9 from roller 8. By the above adjusting means, masses of dough passing through the rollers may be fabricated into sheets of various sizes and thicknesses.

The pilot roller 12 is suitably mounted on a shaft 24 rotatably mounted at 25 in the uprights of the frame. Each upright is provided with an extending boss 26 having a bore 27 in which is rotatably received a shaft 28 upon which the curling roller is mounted. Shaft 28 may be driven by any suitable means, not shown.

Bosses 26 are adapted to receive encircling disks 29 and 30 upon which the guide 15 may be secured by any suitable means such as screws 31. Guide 15 is curved so as to conform with the circular shape of the disks. As shown in Figs. 1 and 2 the disks are preferably constructed in two semi-circular parts 32 and 33 which may be secured upon one another by means of screws 34. The disks are adapted for rotation relative to bosses 26 upon which the disks are mounted. As guide 15 provides a connection between the disks, the disks will of course move in unison. It will be noted therefore that guide 15 may be moved from the position shown in Fig. 2, to the position shown in Fig. 4, by simply imparting slight rotatory motion to one of the disks such as 30. Movement of the guide in the above manner serves to accomplish gravitation of the roll or loaf 110 as hereinbefore described.

The means for imparting partial rotation to disk 30 comprises a longitudinal rod 35 having pivotal mounting on disk 30 by means of a perforate lug 36 on the lower end of rod 35, which receives a stud 37 carried by disk 30. As shown in Fig. 2, rod 35 may, if desired, be made in two parts 38 and 39 suitably connected by means of a pivotal pin 40. Said connection provides for flexibility and easy manipulation of the guide mechanism. The upper portion 38 of rod 35 is suitably supported in a bracket 41 mounted on the upright 20. Bracket 41 is provided with an enlarged bore 42 which slidably receives rod 38. Rod 38 is suitably threaded at its free end 43 for receiving a hand wheel 44 provided with co-operating internal threads 45. It will be understood that by manipulating the hand wheel 44, rod 35 may be reciprocated for imparting rotatory motion to the disks and guide 15. A collar 46 may be secured on rod 35 by any suitable means such as a set screw 47 for limiting upward reciprocation of the rod. On the threaded portion 43 of rod 35, a flat portion 48 may be provided for receiving numerals or other indicating means, for indicating the position of the guide 15 relative to the loaves of dough 110.

Although the drawings show a curling roller of a particular type, it is to be understood that a curling roller of any other construction will co-operate satisfactorily with guide 15. It is to be noted also that various means of assembling the dough molder will permit of using a one-piece disk 30.

From the foregoing it should be clear that a roll or loaf of dough 110, after being formed upon the top of curling roller 10 may be readily displaced from its position by advancing the guide 15 beneath the loaf. Said advancement of the guide serves to lift the loaf out of contact with the curling roller, thereby overcoming the lifting force of the curling roller, and allowing gravity to act upon the cylindrical loaf. This operation has been described in detail in a preceding paragraph.

Means is provided for directing the cylindrical loaf from the curling roller onto the revolving drum 50 of the dough molder. Said means comprises a pair of spaced adjustable guides 51 mounted in an upright position upon a transverse bar 52 suitably secured to the sides 19 and 20 of the dough molder frame. In the drawings, said bar 52 is shown supported by a pair of brackets 53 mounted upon the upright sides of the dough molder. Each guide 51 comprises an upright flat portion 54 which provides an abutment for the cylindrical mass of dough formed on the curling roll. A perforate base 55 is adapted for abutment upon bar 52 and is securely held thereon by screws or studs 56 which may enter any of the spaced threaded perforations 57 of the transverse bar. Perforations 57 are aligned and provide means whereby either guide may be adjusted longitudinally of the bar. A strengthening rib 58 may be provided on each guide if desired.

By means of the guides 51, the cylindrical rolls of dough formed on the curling roll may be directed onto the rolling surface 59 of revolving drum 50. A pressure board 60 co-operates with said drum 50 for elongating the cylindrical roll of dough directed thereonto by the guides 51. Annular flanges 61 of the drum limit the extent to which the rolls of dough may be elongated.

It should be clear from the foregoing explanation that a sheet of dough rolled into the shape of a cylinder may be readily discharged from the curling roller by placing the curler guide 15 in adjusted position. The cylindrical roll upon being discharged from the curling roll, is directed onto the drum 50 by guides 51, whereupon it is further shaped and formed by the drum and co-operative pressure board in the usual manner.

It is to be understood that various modifications may be made in the structural details of the device without departing from the spirit and scope of this invention as set forth in the appended claims.

What is claimed is:

1. In a device of the class described the combination of a pair of rollers rotatable in close proximity with one another and in the same direction, one of the rollers being so disposed relative to the other that the axis of one roller falls without vertical and horizontal planes containing the axis of the other roller, a normally stationary guide member disposed in close proximity with the lowermost roller, and movable supporting means for moving the guide member concentrically about the lowermost roller.

2. The combination with a curling means and a pilot means, of a supporting means therefor, a pair of circular members rotatably mounted on the supporting means, a guide member connecting the circular members and having an edge thereof disposed in close proximity with the curling means, and means comprising a reciprocable rod having connection with one of the circular members, for imparting partial rotation to the circular members and the guide whereby to move the guide edge toward and from the pilot means.

3. The combination with a curling means and a pilot means, of a supporting means therefor, a pair of circular members rotatably mounted on the supporting means, a guide member connecting the circular members and having an edge thereof disposed in close proximity with the curling means, and means for imparting partial rotation to the circular members and the guide whereby to move the guide edge toward and from the pilot means.

4. In a device of the class described, the combination of means for shaping individual masses of plastic material into sheet form, a pair of rollers for receiving and operating upon the individual sheets of material to work each sheet into a substantially cylindrical loaf, said rollers being rotatable in the same direction and disposed one above the other in close proximity, a normally stationary longitudinal curved guide member partially encircling the lowermost roller and disposed in close proximity therewith, rotatable support means for the guard member, a reciprocable rod connected with the said support means and adapted for effecting movement of the guide member relative to the rollers, and an indicating means associated with the device for indicating the relative positions of the guard to the rollers.

5. In a device of the class described, the combination with means for shaping individual masses of plastic material into sheet form, of a pair of rollers for receiving and operating upon the individual sheets of material to work each sheet into a substantially cylindrical loaf, said rollers being rotatable in the same direction and disposed one above the other in close proximity, a normally stationary curved guide member extending partly about the lowermost roller to provide a receiving means and track for the cylindrical loaves, and movable supporting means for moving the guide member concentrically relative to the lowermost roller whereby to position the guide member for the reception of loaves of various sizes.

6. In a dough molder, having a revolving drum, the combination of a curling roller, a pilot roller disposed adjacent the curling roller and co-operating therewith for shaping sheet material into substantially cylindrical rolls, rotatably supported means comprising a guide adjustable for cooperation with the curling roller for effecting removal of the cylindrical rolls from the co-operating rollers, and a second guide means for guiding the cylindrical rolls onto the revolving drum.

7. In a dough molder provided with a revolving drum, the combination of a curling roller, a pilot roller disposed adjacent the curling roller and co-operating therewith for shaping sheet material into substantially cylindrical rolls, rotatably supported means comprising a guide adjustable for cooperation with the curling roller for effecting removal of the cylindrical roll from the co-operating rollers, and means comprising a pair of spaced upright guide plates for directing the cylindrical roll of material onto the revolving drum of the dough molder.

8. The combination with means for coiling sheets of material into substantially cylindrical rolls, said means comprising a curling roller arranged to exert a lifting force upon the said cylindrical rolls while in the process of formation, of independently adjustable rotatably supported means movable to positions beneath the formed roll for releasing said roll from the lifting influence of the curling roller, thereby permitting gravitation of the formed roll from its position above the curling roller.

9. The combination with means for coiling sheets of material into substantially cylindrical rolls, said means comprising a curling roller arranged to exert a lifting force upon the said cylindrical rolls of material, of means having a longitudinal edge in constant spaced relationship with the periphery of the curling roller, and independently adjustable means for moving said last mentioned means to position the longitudinal edge beneath the formed roll whereby to effect release of the said roll from the lifting influence of the curling roller.

10. In combination with means comprising a curling roller for coiling a sheet of material into substantially cylindrical rolls, a guide member having a longitudinal edge in constant spaced relationship with the periphery of the curling roller, and means for adjusting the guide member to move said edge about the periphery of said roller and in constant spaced relationship thereto.

11. In a device of the class described the combination of a rotatable curling roller, a pilot roller having its axis above and to one side of a vertical diameter of the curling roller, supporting means having pivotal movement about the axis of the curling roller a guide on the supporting means and provided with a longitudinal edge in constant spaced parallelism with the axis and periphery of the curling roller and means for effecting adjustment of the support means whereby the said longitudinal edge is caused to approach and recede from the pilot roller while retaining its constant spacing from the periphery of the curling roller.

12. In a dough molding machine the combination with a frame having mounted thereon a roller and another fluted roller rotating in the same direction to form a sheet of dough into a spiral roll, and kneading means for receiving said roll from said fluted roller, of an arcuate apron concentric with and covering a poriton of the surface of said fluted roller to guide said spiral roll to said kneading means, and means for adjusting said apron circumferentially of said fluted roller toward and from the first-mentioned roller.

13. In a dough molding machine the combination with a roller and another roller rotating in the same direction to form a sheet of dough into a spiral roll, and kneading means for receiving said roll from said roller, of an apron for guiding said spiral roll from said roller to said kneading means, comprising a main plate arranged substantially parallel with the first-mentioned roller, an arcuate apron plate concentric with said first-mentioned roller and movable between said main plate and the periphery of said roller toward and from the second-mentioned roller and covering a portion of the surface of said first-mentioned roller, and means for moving said apron plate circumferentially of said first-mentioned roller.

14. In a dough molding machine the combination with a frame having mounted thereon a roller and another fluted roller rotating in the same direction to form a sheet of dough into a spiral roll, and kneading means for receiving said roll from said fluted roller, of an arcuate apron concentric with and covering a portion of the surface of said fluted roller to guide said spiral roll to said kneading means, and means for adjusting said apron circumferentially of said fluted roller toward and from the first-mentioned roller including a bar slidably mounted on said frame and having a pivotal connection with said apron plate.

In testimony whereof, I have hereunto subscribed my name this 8th day of May, 1928.

WILLIAM G. KIRCHHOFF.